(12) United States Patent
Stanciu et al.

(10) Patent No.: US 9,499,734 B2
(45) Date of Patent: Nov. 22, 2016

(54) WATER BLOCKAGE AGENTS USING HYDROLYZED CANOLA PROTEIN HYDROGELS

(71) Applicant: Halliburton Energy Services, Inc., Houston, TX (US)

(72) Inventors: Corneliu Stanciu, Kingwood, TX (US); Loan K. Vo, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 22 days.

(21) Appl. No.: 14/758,874

(22) PCT Filed: Aug. 27, 2014

(86) PCT No.: PCT/US2014/052808
§ 371 (c)(1),
(2) Date: Jul. 1, 2015

(87) PCT Pub. No.: WO2016/032446
PCT Pub. Date: Mar. 3, 2016

(65) Prior Publication Data
US 2016/0251563 A1    Sep. 1, 2016

(51) Int. Cl.
*E21B 33/138* (2006.01)
*C09K 8/514* (2006.01)
*C09K 8/508* (2006.01)
*C09K 8/512* (2006.01)

(52) U.S. Cl.
CPC ............... *C09K 8/514* (2013.01); *C09K 8/508* (2013.01); *C09K 8/512* (2013.01); *E21B 33/138* (2013.01)

(58) Field of Classification Search
CPC ...... C09K 8/512; C09K 8/514; C09K 8/508; C09K 8/035; C09K 8/516; C09K 8/805; E21B 33/138
See application file for complete search history.

(56) References Cited

U.S. PATENT DOCUMENTS

| | | |
|---|---|---|
| 3,639,559 A | 2/1972 | Tax |
| 6,109,350 A | 8/2000 | Nguyen et al. |
| 6,283,210 B1 | 9/2001 | Soliman et al. |
| 6,889,766 B2 | 5/2005 | Creel et al. |
| 8,196,655 B2 | 6/2012 | Kalman et al. |
| 8,360,145 B2 | 1/2013 | Kalman et al. |
| 2004/0168798 A1 | 9/2004 | Creel et al. |
| 2004/0168804 A1 | 9/2004 | Reddy et al. |
| 2011/0077323 A1 | 3/2011 | Everett et al. |
| 2013/0000900 A1 | 1/2013 | Kalgaonkar et al. |

FOREIGN PATENT DOCUMENTS

WO    2016032446 A1    3/2016

OTHER PUBLICATIONS

European Polymer Journal, Synthesis and properties of Canola protein-based superabsorbent hydrogels, 2014, 54, 172-180.
Industrial Crops and Products, Processing and physical properties of canola protein isolate-based films, 2014, 52, 269-277.
Journal of Food Science, Canola Proteins for Human Consumption: Extraction, Profile, and Functional Properties, 2011, 76(1), R16-R28.
GRAS Notification for Canola Protein Isolet (Isolexx™) and Hydrolyzed Canola Protein Isolate (Vitalexx™), 2011 submission to FDA.
Journal of Biological Chemistry, Biologically Active Water-Insoluble Protein Polymers, 1967, 242(7), 1651-1659.
International Search Report and Written Opinion for PCT/US2014/052808 dated May 12, 2015.

*Primary Examiner* — Zakiya W Bates
(74) *Attorney, Agent, or Firm* — McDermott Will & Emery LLP; Craig Roddy

(57) ABSTRACT

Conformance fluids comprising a base fluid; and a canola protein-based hydrogel comprising a copolymer of a water-swellable polymeric material grafted onto a hydrolyzed canola protein backbone, wherein the canola protein-based hydrogel is present in the conformance fluid in an amount in the range of from about 1% to about 10% by weight of the conformance fluid.

20 Claims, 1 Drawing Sheet

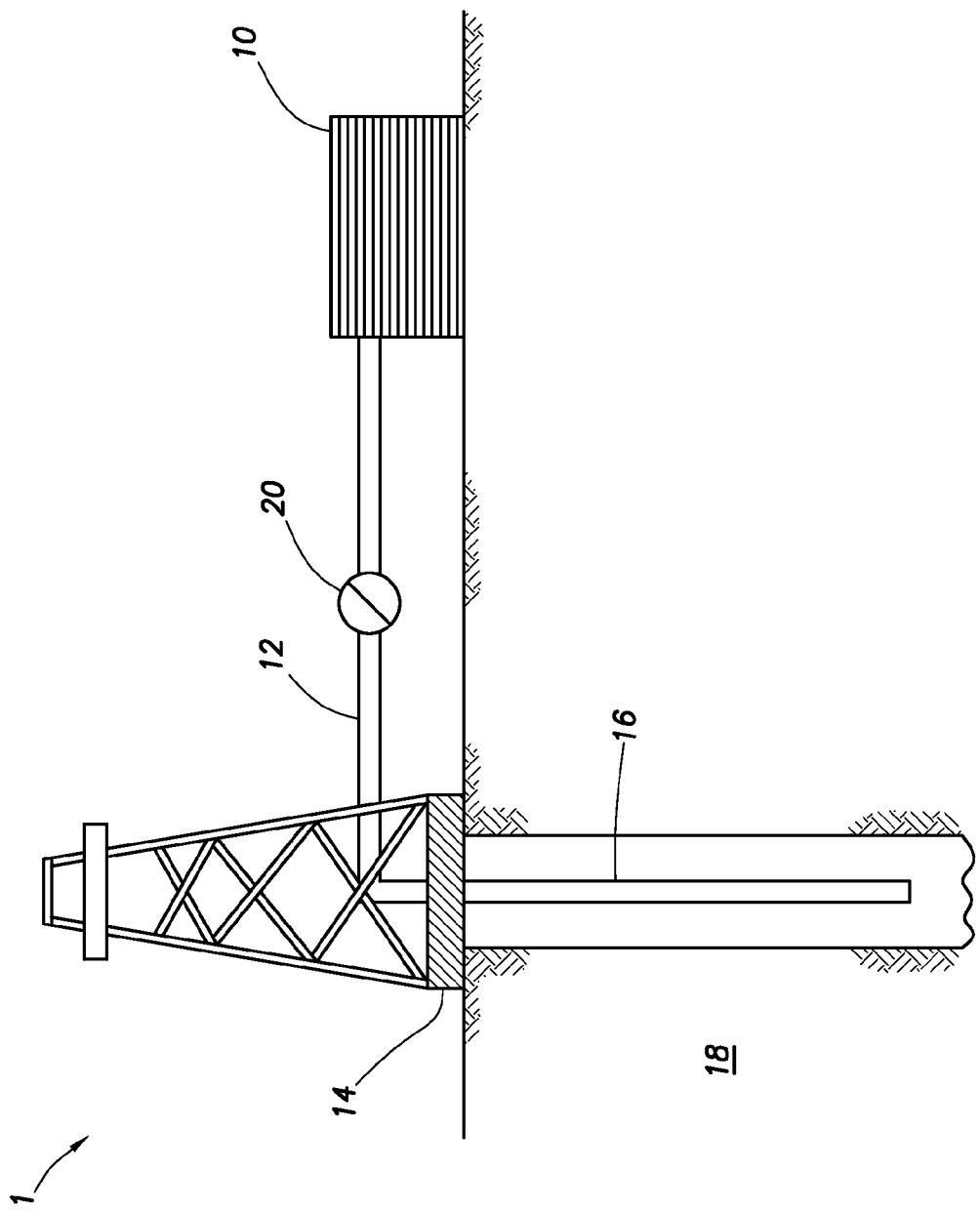

WATER BLOCKAGE AGENTS USING HYDROLYZED CANOLA PROTEIN HYDROGELS

BACKGROUND

The embodiments herein generally relate to subterranean formation operations and, more particularly, to the use of water blockage agents using hydrolyzed canola protein hydrogels. As used herein, the term "hydrogel" refers to a gelled network of crosslinked macromolecules capable of undergoing a change in volume (i.e., swelling or shrinking) based on exposure to certain environmental conditions.

A natural resource, such as oil, residing in a subterranean formation may be recovered by drilling a well into the subterranean formation. The well may be isolated from the surrounding subterranean formation using an operation known as cementing. In a cementing operation, a cement sheath around a casing (or liner string) may be placed within the well. The cement sheath is formed by pumping a cement slurry through the bottom of the casing and out through the annulus between the outer casing wall and the formation face of the wellbore. The cement slurry then cures in the annular space, thereby forming a sheath of hardened cement that, inter alia, supports and positions the casing in the wellbore and bonds the exterior surface of the casing to the subterranean formation.

The subterranean formation may thereafter be stimulated for the production of oil through the cemented wellbore. In some operations, the subterranean formation may be stimulated by a hydraulic fracturing treatment. In hydraulic fracturing treatments, a treatment fluid is pumped past the cement sheath into a portion of the subterranean formation at a rate and pressure such that the subterranean formation breaks down, and one or more fractures are formed. Typically, particulate solids, such as graded sand, are suspended in a portion of the treatment fluid and then deposited into the fractures. These particulate solids, or "proppant particulates," serve to prop open the fracture (e.g., keep the fracture from fully closing) after the hydraulic pressure is removed. By keeping the fracture from fully closing, the proppant particulates aid in forming conductive paths through which produced fluids, such as oil, may flow.

During oil production from a subterranean formation, water may seep from the formation and accompany the produced oil. The production of water with the produced oil may present major problems, including a significant reduction of oil production, the need for costly remedial actions, downtime in production, and the like. The water may seep into the wellbore with produced oil from any subterranean zone in communication with the oil producing formation, such as, for example, through a fracture, a high-permeability streak, a high-permeability zone, and the like, or may be the result of water coning, water cresting, lateral channeling, and the like. Additionally, the source of the water may be from waterflood techniques.

Conformance control treatments may be used to reduce the influx of water ("water shutoff") with produced oil into a wellbore in a subterranean formation. As used herein, the term "conformance control" and any variants thereof (e.g., "conformance treatments" or "conformance control treatments") refers to treatments that prevent, reduce, or otherwise control the influx of the undesired fluids (e.g., water) into the wellbore. Such conformance treatments typically employ particulates, gels, sealants, blocking polymers, and the like to restrict the flow of undesired fluids. Conformance control treatments may enhance recovery efficiency and reduce costly downtime or separation techniques required for separating the oil from unwanted produced water.

BRIEF DESCRIPTION OF THE DRAWINGS

The following FIGURES are included to illustrate certain aspects of the embodiments described in the present disclosure, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the conformance fluids of the embodiments described herein to a downhole location.

DETAILED DESCRIPTION

The embodiments herein generally relate to subterranean formation operations and, more particularly, to the use of water blockage agents using hydrolyzed canola protein hydrogels (CPBH). The CPBH of the present disclosure comprises a water-swellable polymeric material grafted onto a hydrolyzed canola protein backbone. The water-swellable polymeric material in the CPBH itself swells in the presence of water and the synergistic interaction between the water-swellable polymeric material and the hydrolyzed canola protein backbone forming the CPBH is capable of further absorbing water to swell by a substantially greater volume than the water-swellable polymeric material alone. The capacity of the CPBH to swell in an aqueous environment allows it to act as a sealant in a subterranean formation, sealing portions of the subterranean formation, such as permeable zones during conformance treatments. As used herein, the term "sealant" refers to a substance that inhibits the flow of a fluid between two locations (e.g., between two portions of a subterranean formation, between two portions of a wellbore, between two portions of a wellbore and a tubular string disposed therein, and the like). In the case of a conformance treatment, the sealant may reduce the permeability (a measure of fluid flow connectivity) of a subterranean formation to fluid flow (e.g., water) by about 60% or greater (e.g., about 75% or greater, or about 95% or greater), thereby lowering the influx of the fluid (e.g., water) into the wellbore or preventing loss of a treatment fluid from wellbore into the subterranean formation.

The CPBH of the present disclosure may be referred to as a protein-based superabsorbent polymer hydrogel because it is able to absorb and retain a large amount of water in its polymeric gelled network. The CPBH described herein is beneficially composed of canola protein, which is derived from canola, a readily available and relatively inexpensive staple crop that is nontoxic, biocompatible, and biodegradable. Canola protein is also characterized by numerous chemical sites for modification and crosslinking, beneficially enhancing the hydrogel nature of the CPBH described herein, its swelling capacity, and its stability for use as a sealant in subterranean formation operations.

In some embodiments, the methods and compositions described herein may be with reference to a conformance treatment operation (i.e., restricting undesirable water flow into a wellbore in a subterranean formation). However, the CPBH and conformance fluids described herein may be used in any other subterranean formation operation that may employ a water-swellable sealant and/or a treatment fluid comprising a water-swellable sealant. Such subterranean formation operations may include, but are not limited to, a diverting operation, a plugging operation, a primary cementing operation, a secondary cementing operation, a remedial cementing operation, a drilling operation, a stimulation operation, an acidizing operation, an acid-fracturing operation, a sand control operation, a fracturing operation, a frac-packing operation, a remedial operation, a near-wellbore consolidation operation, and any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

The words or terms used herein have their plain, ordinary meaning according to one of skill in the art, except to the extent explicitly and clearly defined in this disclosure or unless the specific context requires a different meaning. If there is any conflict in the usages of a word or term in the present disclosure and one or more patent(s) or other document(s) that may be incorporated in their entirety by reference, the definitions that are consistent with this specification should be adopted.

The words "comprising," "containing," "including," "having," and all grammatical variations thereof are intended to have an open, non-limiting meaning. For example, a composition "comprising" a component does not exclude it from having additional components, and a method "having" a step does not exclude it from having additional steps. When such terms are used, the compositions and methods that "consist essentially of" or "consist of" a specified component or step are specifically included and disclosed. Additionally, while compositions and methods are described herein in terms of "comprising" various components or steps, the compositions and methods can also "consist essentially of" or "consist of" the various components and steps. As used herein, the term "consisting essentially of," and all grammatical variations thereof are intended to limit the scope of a claim to the specified materials or steps and those that do not materially affect the basic and novel characteristic(s) of a claim disclosed herein.

In some embodiments, the present disclosure provides a conformance fluid comprising a base fluid and a CPBH comprising a copolymer of a water-swellable polymeric material grafted onto a hydrolyzed canola protein backbone. As will be discussed in detail below, the base fluid may be aqueous, wherein the CPBH absorbs in the aqueous base fluid or it may be non-aqueous, wherein the CPBH absorbs upon later passing an aqueous fluid over the CPBH.

The conformance fluids may be prepared at the well site (or job site), at a plant or facility prior to use, and/or certain components of the conformance fluid may be pre-mixed prior to use and then transported to the well site (e.g., any additives, and the like). In some embodiments, the preparation of the conformance fluid may be performed at a well site "on-the-fly." As used herein, the term "on-the-fly" refers to performing an operation during a subterranean treatment that does not require stopping normal operations (e.g., combining two or more components wherein a flowing stream of one element is continuously introduced into a flowing stream of another element so that the streams are combined and mixed while continuing to flow as a single stream as part of an on-going treatment). For example, the CPBH may be added to the base fluid on-the-fly. Such mixing may be described as "real-time" mixing.

In some embodiments, the CPBH may be present in the conformance fluid in an amount in the range of from a lower limit of about 1%, 0.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the conformance fluid, encompassing any value and subset therebetween. In some embodiments, the CPBH may be present preferably in the conformance fluid in the range of from about 3% to about 7%, or about 5% by weight of the conformance fluid. The amount of CPBH to include in a particular conformance fluid may depend on a number of factors including, but not limited to, the conditions of the subterranean formation being treated (e.g., the permeability of the formation), the type of CPBH selected (e.g., the type and amount of the water-swellable polymeric material and hydrolyzed canola protein, any chemical modifications to the CPBH, and the like), the type of base fluid selected, any additives included in the conformance fluid, and the like.

As previously stated, the CPBH of the present disclosure may be referred to as a protein-based superabsorbent polymer hydrogel because it is able to absorb and retain a large amount of water in its polymeric gelled network. Specifically, in some embodiments, the swelled volume of the CPBH (i.e., in the presence of an aqueous fluid) may be between a lower limit of about 30 times, 40 times, 50 times, 60 times, 70 times, 80 times, 90 times, 100 times, 110 times, 120 times, 130 times, 140 times, 150 times, and 160 times to an upper limit of about 300 times, 290 times, 280 times, 270 times, 260 times, 250 times, 240 times, 230 times, 220 times, 210 times, 200 times, 190 times, 180 times, 170 times, and 160 times, encompassing any value and subset therebetween, as compared to the unswelled volume of the CPBH (i.e., not in the presence of an aqueous fluid or having never been in the presence of an aqueous fluid). The CPBH accordingly provides significant swelling capacity to seal zones in a subterranean formation (e.g., permeable zones) and restrict fluid flow therethrough.

The CPBH may be formed by graft polymerization forming covalent bonds between the water-swellable polymeric material and the backbone of a hydrolyzed canola protein, which may be achieved in the presence of crosslinkers and/or polymerization initiators.

Suitable water-swellable polymeric materials for use in forming the CPBH may be any water-swellable polymeric material capable of graft polymerization onto the backbone of a hydrolyzed canola protein. Examples of suitable water-swellable polymeric materials may include, but are not limited to, an acrylamide, a polyacrylamide, a methacrylic acid, a polymethacrylamide, an acrylamide copolymer, a methacrylamide copolymer, an acrylamide-co-t-butylacrylate copolymer, a 2-acrylamido-2-methylpropane sulfonic acid/acrylamide copolymer, a sulfonated styrene/maleic anhydride copolymer, a vinylpyrrolidone/2-acrylannido-2-nnethylpropane sulfonic acid/acrylamide terpolymer, a 2-acrylamido-2-methylpropane sulfonic acid/N—N-dimethylacrylamide/acrylamide terpolymer, a polyacrylate, a poly(hydroxyalkyl methacrylate), a poly(N-vinyl-2-pyrolidone), a poly(acrylic acid-co-acrylamide), a graft-poly(ethylene oxide) of poly(acrylic acid), a poly(2-hydroxyethyl methacrylate), a poly(2-hydroxypropyl methacrylate), N-isopropylacrylamide, any derivative thereof, and any combination thereof. In some embodiments, the water-swellable polymeric material may form between a lower limit of about 30%, 50% 100%, 200%, 250%, 300%, 350%, 400%, 450%, 500%, 550%, 600%, and 700% to an upper limit of about 1300%, 1250%, 1200%, 1150%, 1100%, 1050%, 1000%, 950%, 900%, 850%, 800%, 750%, and 700% by weight of the CPBH, encompassing any value and subset therebetween.

The hydrolyzed canola protein backbone forming a portion of the CPBH may generally have the formula represented by Formula I below:

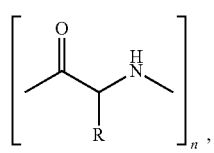

Formula I wherein the R group is an amino acid selected from the group consisting of alanine, arginine, aspartic acid, cysteine, glutamic acid, glycine, histidine, isoleucine, leucine, lysine, methionine, phenylalanine, proline, serine, threonine, tryptophan, tyrosine, and valine, and wherein n is an integer between a lower limit of about 500, 600, 700, 800, 900, 1000, 1100, 1200, 1300, 1400, and 1500 to an upper limit of about 2500, 2400, 2300, 2200, 2100, 2000, 1900, 1800, 1700, 1600, and 1500.

The aromatic amino acid content of the hydrolyzed canola protein is particularly beneficial to its function as a sealant, such as in a conformance treatment operation, because it imparts a hydrophobic nature to the hydrolyzed canola protein. Accordingly, the hydrolyzed canola protein imparts a hydrophobic nature to the CPBH, which synergistically works in concert with the swellability of the CPBH to mechanically and chemically repel water from entering a wellbore from a subterranean formation. The aromatic amino acid content of the hydrolyzed canola protein of the present disclosure is generally in the range of a lower limit of about 7%, 7.1%, 7.2%, 7.3%, 7.4%, 7.5%, 7.6%, 7.7%, 7.8%, 7.9%, 8%, 8.1%, and 8.2% to an upper limit of about 9.5%, 9.4%, 9.3%, 9.2%, 9.1%, 9%, 8.9%, 8.7%, 8.6%, 8.5%, 8.4%, 8.3%, and 8.2%, encompassing any value and subset therebetween.

In some embodiments, the hydrophobic nature of the CPBH may be further enhanced by hydrophobically modifying the hydrolyzed canola protein backbone forming a portion of the CPBH. To hydrophobically modify the hydrolyzed canola protein backbone, the R group amino acid may be reacted with a hydrophobic group. Any hydrophobic group compatible with the hydrolyzed canola protein backbone may be suitable, provided that it does not adversely interfere with the desired swelling capacity of the CPBH including the hydrophobically modified hydrolyzed canola protein. Examples of suitable hydrophobic groups may include, but are not limited to, ethyleneoxide, an ethyleneoxide derivative, propyleneoxide, a propylene oxide derivative, a long-chain hydrocarbon (e.g., a long-chain fatty acid), and any combination thereof. Derivatives of these hydrophobic groups may also be suitable. As used herein, the term "long-chain hydrocarbon" refers to a compound having between about 6 and about 40 carbons, encompassing any value and subset therebetween. That is, a long-chain hydrocarbon suitable for modifying the hydrolyzed canola protein backbone of the present disclosure may comprise between a lower limit of about 6, 7, 8, 9, 10, 11, 12, 13, 14, 15, 16, 17, 18, 19, 20, 21, 22, and 23 to an upper limit of about 40, 39, 38, 37, 36, 35, 34, 33, 32, 31, 30, 29, 28, 27, 26, 25, 24, and 23 carbons, encompassing any value and subset therebetween. The long-chain hydrocarbons may include fatty acids and fatty alcohols, including, but not limited to, oleic acid, linoleic acid, linolenic acid, palmitic acid, stearic acid, palmitoleic acid, spaienic acid, elaidic acid, vaccenic acid, linoelaidic acid, euric acid, tall oil, any derivative thereof, and any combination thereof.

In some embodiments, the hydrolyzed canola protein backbone for use in forming the CPBH of the present disclosure may by hydrophobically modified by reacting in the range of between a lower limit of about 5%, 10%, 15%, 20%, 25%, 30%, 35%, 40%, 45%, and 50% to an upper limit of about 95%, 90%, 85%, 80%, 75%, 70%, 65%, 60%, 55%, and 50% of the R group amino acids of the hydrolyzed canola protein of Formula I with a hydrophobic group, encompassing any value and subset therebetween.

In some embodiments, the hydrolyzed canola protein may be chemically reacted with ethyl chloroformate to enhance the hydrophobic nature of the CPBH to which it is included, by methods known in the art. The use of ethyl chloroformate may be used alone or in combination with hydrophobic modification of the hydrophobic groups discussed previously, and any other modification or enhancement of the CPBH for use as a sealant described herein. The ethyl chloroformate may be used to convert at least a portion of the hydrolyzed canola protein into an insoluble, and thus hydrophobic, protein. The ethyl chloroformate may be reacted with the hydrolyzed canola protein in the presence of an aqueous fluid, either prior to forming the CPBH, or after forming the CPBH, such as when the base fluid of the conformance fluid is an aqueous fluid. Owing to the insolubility of the ethyl chloroformate, the reaction proceeds in a heterogeneous system leading to enhanced hydrophobicity of the CPBH described herein. Generally, the ethyl chloroformate should be present in an amount in the range of a lower limit of about 0.1 mL, 0.2 mL, 0.3 mL, 0.4 mL, and 0.5 mL to an upper limit of about 1 mL, 1.9 mL, 1.8 mL, 1.7 mL, 1.6 mL, and 1.5 mL per 1 gram of the hydrogenated canola protein (whether alone or in the CPBH).

In some embodiments, the water-swellable polymeric material may be grafted onto the backbone of the hydrolyzed canola protein in the presence of a crosslinker. The crosslinker may act, among other things, to stabilize the CPBH, particularly at high temperatures or in the presence of certain breakers (e.g., acid breakers). The presence of the crosslinker may additionally alter the charge density of the polymeric chains in the CPBH, thereby increasing the resistance of the CPBH to denaturation in certain environments or upon contact with certain denaturants. In some formulations, an overabundance of crosslinker may result in such an increase of polymeric linkages in the CPBH to decrease its capacity for water absorbency (i.e., the linkages cause less room to be present in the CPBH for water to absorb). Accordingly, in some embodiments, the crosslinker may be included during the graft polymerization process forming the CPBH in an amount in the range of from a lower limit of about 0.01%, 0.02%, 0.03%, 0.04%, 0.05%, 0.06%, 0.07%, 0.08%, 0.09%, and 0.1% to an upper limit of about 1%, 0.9%, 0.8%, 0.7%, 0.6%, 0.5%, 0.4%, 0.3%, 0.2%, and 0.1% by weight of the CPBH, encompassing any value and subset therebetween. Suitable crosslinkers for use in forming the CPBH of the present disclosure may include, but are not limited to, N,N'-methylenebis(acrylamide), tetraethylene glycol, ethylene glycol diacrylate, a vinyl halide, an acrylic monomer, and any combination thereof. Derivatives of these crosslinkers may also be suitable.

In some embodiments, the water-swellable polymeric material may be grafted onto the backbone of the hydrolyzed canola protein in the presence of an initiator (which in some embodiments may also be in the presence of one or more crosslinkers). The initiator may aid the graft polymerization process by, among other ways, forming more free radicals, thereby leading to higher crosslinking density and greater stability of the CPBH. The presence of the free radicals may also beneficially increase swellability of the CPBH, at least during the first several hours (e.g., between about 0 and about 6 hours) that the CPBH is in contact with an aqueous fluid. In some embodiments, the initiator may be included during the graft polymerization process forming the CPBH in an amount in the range of from a lower limit of about 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 4%, 3.9%, 3.8%, 3.7%, 3.6%, 3.5%, 3.4%, 3.3%, 3.2%, 3.1%, 3%, 2.9%, 2.8%, 2.7%, 2.6%, and 2.5% by weight of the CPBH, encompassing any value and subset therebetween. Suitable initiators for use in forming the CPBH of the present disclosure may include, but are not limited to, potassium persulfate, sodium persulfate, ammonium persulfate, sodium bisulfite, peroxodisulfate(VI) ion, azobisisobutyronitrile, benzoyl peroxide, and any combination thereof. Derivatives of these initiators may also be suitable.

In some embodiments, the present disclosure provides a method of preparing a conformance fluid comprising an aqueous base fluid and a CPBH, wherein the aqueous base fluid causes the CPBH to swell. The rate of swelling of the CPBH may depend on a number of factors including, but not limited to, the salinity of the base fluid, the pH of the base fluid, the temperature in the subterranean formation, and the like. The conformance fluid may then be introduced into a subterranean formation to contact at least a portion of a first permeable zone in a subterranean formation, thereby depositing the CPBH onto or into the first permeable zone. That is, as the conformance fluid passes over the first permeable zone, the CPBH may contact the surface of the subterranean formation and remain thereon (e.g., by chemical binding, adhesion forces, and the like) or may penetrate into the pore throats of the subterranean formation (e.g., into the pore throats defining the first permeable zone). The swelled or swelling CPBH then seals (either immediately or over time) at least a portion of the first permeable zone. In some embodiments, the conformance fluid may be used to divert fluid from the first permeable zone to another zone of interest during a subterranean formation operation. The steps of contacting the conformance fluid with the subterranean formation, depositing the CPBH onto or into a permeable zone, and sealing at least a portion of the permeable zone may be repeated multiple times at a second, third, fourth, etc. permeable zone in the subterranean formation.

In some embodiments, the present disclosure provides a method of preparing a conformance fluid comprising non-aqueous base fluid and a CPBH, wherein the CPBH is not expected to appreciably swell (e.g., while some swelling may occur, no more than about 10% of total swellability is expected to occur in a non-aqueous base fluid). The conformance fluid may then be introduced into a subterranean formation so as to contact at least a portion of a first permeable zone in the subterranean formation, thereby depositing the CPBH onto or into the first permeable zone. Thereafter, an aqueous fluid may be passed over the first permeable zone so as to contact the CBPH deposited thereon or therein and cause the CPBH to swell and seal at least a portion of the first permeable zone. In some embodiments, the aqueous fluid may be an aqueous base fluid, such as one described herein, introduced into the subterranean formation. In other embodiments, the water from the formation itself may be the aqueous fluid that contacts the CPBH and causes it to swell. In some embodiments, the steps of contacting the conformance fluid with the subterranean formation, depositing the CPBH onto or into a permeable zone, passing an aqueous fluid over the CPBH, and sealing at least a portion of the permeable zone may be repeated multiple times at a second, third, fourth, etc. permeable zone in the subterranean formation.

The base fluid described herein may be either an aqueous base fluid or a non-aqueous base fluid. Suitable aqueous base fluids (which may also be the aqueous fluid that is passed over the CPBH to cause swelling) may include, but are not limited to, fresh water, formation water, produced water, saltwater (e.g., water containing one or more salts dissolved therein), seawater, and any combination thereof. Generally, the aqueous base fluid may be from any source, provided that it does not contain components that may adversely interfere with the swelling of the CPBH to form a seal in a subterranean formation. The crosslinks in the CPBH may be disrupted by the presence of salts, thereby causing the CPBH to become ineffective or less effective at swelling in the presence of the aqueous fluid. Accordingly, any aqueous fluid (or non-aqueous fluid) used in forming the conformance fluids described herein should not have a salt content greater than about 0.5M, or preferably not greater than about 0.25M, or about 0.1M, or even less. Suitable non-aqueous base fluids for forming the conformance fluids described herein may include, but are not limited to, alkanes, olefins, aromatic organic compounds, cyclic alkanes, paraffins, diesel fluids, mineral oils, desulfurized hydrogenated kerosenes, and any combination thereof.

In some embodiments, the conformance fluids of the present disclosure may further comprise a buffering agent used to adjust the pH of the conformance fluid comprising the CPBH. The swellable properties of the CPBH may, in some cases, be tuned depending on the pH of the conformance fluid to which it is exposed. In some embodiments, the CPBH may lose its swellability character at pH ranges below about 2 and above about 12. In very acidic conformance fluids, the hydrogel chains are believed to be protonated, resulting in a diminishment of anion-anion repulsive forces and low water absorbency. In very basic conformance fluids, it is believed that an ion-induced charge screening effect occurs, interfering with the electrostatic repulsions thereby lowering water absorbency. Swelling is believed to be optimal when the conformance fluid has a low ionic strength. Suitable pH ranges for the conformance fluid may be preferably between about 3 and about 11, more preferably between about 5 and about 9, and even more preferably between about 6 and about 8. Suitable buffering agents for use in adjusting the pH of the conformance fluids described herein may include, but are not limited to, sodium carbonate, potassium carbonate, sodium bicarbonate, potassium bicarbonate, sodium diacetate, potassium diacetate, sodium phosphate, potassium phosphate, sodium hydrogen phosphate, potassium hydrogen phosphate, sodium dihydrogen phosphate, potassium dihydrogen phosphate, sodium hydroxide, potassium hydroxide, hydrogen chloride, sulfuric acid, nitric acid, and any combination thereof.

In some embodiments, the conformance fluid may further comprise a hydrocolloid agent to further enhance the hydrophobicity, and thus sealing capability, of the CPBH. As used herein, the term "hydrocolloid" refers to a colloid system where the colloid particles are hydrophilic polymers dispersed in water.

Specifically, due to the relatively high aromatic amino acid content, as discussed previously, the hydrophobicity of the CPBH may be further enhanced in the presence of a hydrocolloid agent that favors protein unfolding, thereby exposing buried hydrophobic aromatic amino acids of the CPBH. Suitable hydrocolloid agents may include, but are not limited to, polysaccharides, and derivatives thereof, including those that have one or more of the following monosaccharide units: galactose, mannose, glucoside, glucose, xylose, arabinose, fructose, glucuronic acid, or pyranosyl sulfate. Specific examples of suitable hydrocolloid agents may include, but are not limited to, guar, gum Arabic, locust bean gum, gelatin, pectin, agar, alginate, starch, guar gum and derivatives thereof (e.g., hydroxypropyl guar and carboxymethylhydroxypropyl guar), cellulose and cellulose derivatives (e.g., carboxymethyl cellulose, carboxymethyl cellulose, and hydroxyethyl cellulose), xanthan gum, k-carrageenan, any derivatives thereof, and any combination thereof.

In some embodiments, the hydrocolloid agent, particularly a biopolymer, may be at least partially depolymerized. The term "depolymerized," as used herein, generally refers to a decrease in the molecular weight of the gelling agent molecule by removal of at least some of its monomer units.

In certain embodiments, the hydrocolloid agent may be present in a conformance fluid in an amount ranging from a lower limit of about 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by weight of the conformance fluid, encompassing any value and subset therebetween.

In some embodiments, the conformance fluids described herein may further comprise an oxidizing breaker capable of breaking the crosslinks or bonds in the CPBH (e.g., the bonds between the water-swellable polymeric material and the hydrolyzed canola protein backbone) to disrupt it and cause it to no longer maintain swelled properties in the presence of an aqueous fluid and to no longer form an at least partial seal in a subterranean formation (e.g., a permeable zone). In some embodiments, the oxidizing breaker may be delayed by encapsulation with a coating (e.g., a porous coating through which the breaker may diffuse slowly, or a degradable coating that degrades downhole) that delays the release of the oxidizing breaker. Suitable oxidizing breakers may include, but are not limited to, sodium perborate, hydrogen peroxide, an alkali metal peroxide, sodium carbonate peroxydihydrate, sodium peroxydiphosphate, potassium peroxydiphosphate, potassium carbonate peroxydihydrate, any encapsulated in an encapsulating material, and any combination thereof. In some embodiments, the oxidizing breaker may be present in the conformance fluids described herein in an amount in the range of from a lower limit of about 0.1%, 1%, 2%, 2%, 4%, 5%, 6%, 7%, 8%, 9%, 10%, 11%, 12%, and 13% to an upper limit of about 25%, 24%, 23%, 22%, 21%, 20%, 19%, 18%, 17%, 16%, 15%, 14%, and 13% by weight of the CPBH, encompassing any value and subset therebetween.

The conformance fluids of the present disclosure may, in some embodiments, further comprise an additive, provided that the additive does not interfere with the swellable/sealing capacity of the particular or particular combination of CPBH(s) therein. Suitable additives may include, but are not limited to, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, a friction reducer, a clay stabilizing agent, and any combination thereof.

In various embodiments, systems configured for delivering the conformance fluids comprising CPBH described herein to a downhole location are described. In various embodiments, the systems can comprise a pump fluidly coupled to a tubular, the tubular containing the conformance fluids described herein. It will be appreciated that while the system described below may be used for delivering conformance fluids described herein, one or more portions of the conformance fluid may be delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the conformance fluids to a subterranean formation at or above a fracture gradient of the subterranean formation, but it may also be used in cases where fracturing is not desired. In some embodiments, the high pressure pump may be capable of fluidly conveying particulate matter, such as the non-degradable particulates, the degradable particulates, and the proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the conformance fluids to the high pressure pump. In such embodiments, the low pressure pump may "step up" the pressure of the conformance fluids before reaching the high pressure pump.

In some embodiments, the systems described herein can further comprise a mixing tank that is upstream of the pump and in which the conformance fluids are formulated. In various embodiments, the pump (e.g., a low pressure pump, a high pressure pump, or a combination thereof) may convey the conformance fluids from the mixing tank or other source of the conformance fluids to the tubular. In other embodiments, however, the conformance fluids may be formulated offsite and transported to a worksite, in which case the conformance fluid may be introduced to the tubular via the pump directly from its shipping container (e.g., a truck, a railcar, a barge, or the like) or from a transport pipeline. In either case, the conformance fluids may be drawn into the pump, elevated to an appropriate pressure, and then introduced into the tubular for delivery downhole.

FIG. 1 shows an illustrative schematic of a system that can deliver the conformance fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the conformance fluids of the embodiments herein may be formulated. The conformance fluids may be conveyed via line 12 to wellhead 14, where the conformance fluids enter tubular 16, tubular 16 extending from wellhead 14 into subterranean formation 18. Upon being ejected from tubular 16, the conformance fluids may subsequently penetrate into subterranean formation 18. Pump 20 may be configured to raise the pressure of the conformance fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the conformance fluid may, in some embodiments, flow back to wellhead 14 and exit subterranean formation 18. In some embodiments, the conformance fluid that has flowed back to wellhead 14 may subsequently be recovered and recirculated to subterranean formation 18. It is also to be recognized that the disclosed conformance fluids may also directly or indirectly affect the various downhole equipment and tools that may come into contact with the conformance fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A

A method comprising: (a) preparing a conformance fluid comprising an aqueous base fluid and a canola protein-based hydrogel (CPBH), wherein the CPBH comprises a copolymer of a water-swellable polymeric material grafted onto a hydrolyzed canola protein backbone and is at least partially hydrophobic, and wherein the aqueous base fluid causes the CPBH to swell; (b) contacting the conformance fluid with at least a portion of a first permeable zone in a subterranean formation, thereby depositing the CPBH onto or into the first permeable zone; and (c) sealing at least a portion of the first permeable zone with the CPBH.

Embodiments A may have one or more of the following additional elements in any combination:

Element A1: wherein the hydrolyzed canola protein backbone comprises the formula:

wherein the R group is an amino acid selected from the group consisting of alanine, arginine, aspartic acid, cysteine, glutamic acid, glycine, histidine, isoleucine, leucine, lysine, methionine, phenylalanine, proline, serine, threonine, tryptophan, tyrosine, and valine, and wherein n is an integer between about 500 and about 2500.

Element A2: Further comprising hydrophobically modifying the hydrolyzed canola protein backbone by a reaction of between about 5% and about 95% of the R groups with a hydrophobic group selected from the group consisting of ethyleneoxide, an ethyleneoxide derivative, propyleneoxide, a propylene oxide derivative, a long-chain hydrocarbon, and any combination thereof.

Element A3: Wherein the hydrolyzed canola protein backbone is chemically reacted with ethyl chloroformate.

Element A4: Wherein the water-swellable polymeric material is grafted onto the hydrolyzed canola protein backbone in the presence of a material selected from the group consisting of a crosslinker, an initiator, and any combination thereof, wherein the crosslinker is selected from the group consisting of N,N'-methylenebis(acrylamide), tetraethylene glycol, ethylene glycol diacrylate, a vinyl halide, an acrylic monomer, and any combination thereof, and wherein the initiator is selected from the group consisting of potassium persulfate, sodium persulfate, ammonium persulfate, sodium bisulfite, peroxodisulfate(VI) ion, azobisisobutyronitrile, benzoyl peroxide, and any combination thereof.

Element A5: Wherein the conformance fluid further comprises a hydrocolloid agent in the amount of about 1% to about 10% by weight of the treatment fluid.

Element A6: Wherein the conformance fluid further comprises an oxidizing breaker selected from the group consisting of sodium perborate, hydrogen peroxide, an alkali metal peroxide, sodium carbonate peroxydihydrate, sodium peroxydiphosphate, potassium peroxydiphosphate, potassium carbonate peroxydihydrate, any encapsulated in an encapsulating material, and any combination thereof.

Element A7: Further comprising repeating steps (b) through (c) at at least a second permeable zone in the subterranean formation.

Element A8: Further comprising a wellhead with a tubular extending therefrom and into the subterranean formation, and a pump fluidly coupled to the tubular, wherein step (b) includes introducing the conformance fluid through the tubular.

By way of non-limiting example, exemplary combinations applicable to A include: A with A1, and A3; A with A2, A4, and A8; A with A7 and A8; A with A5, A6, and A7; A with A4 and A6; A with A3, A5, and A8.

Embodiment B

A method comprising: (a) preparing a conformance fluid comprising an aqueous base fluid and a canola protein-based hydrogel (CPBH), wherein the CPBH comprises a copolymer of a water-swellable polymeric material grafted onto a hydrolyzed canola protein backbone and is at least partially hydrophobic, (b) contacting the conformance fluid with at least a portion of a first permeable zone in a subterranean formation, thereby depositing the CPBH onto or into the first permeable zone; (c) passing an aqueous fluid over the first permeable zone, wherein the aqueous base fluid causes the CPBH to swell; and (d) sealing at least a portion of the first permeable zone with the CPBH.

Embodiment B may have one or more of the following additional elements in any combination:

Element B1: wherein the hydrolyzed canola protein backbone comprises the formula:

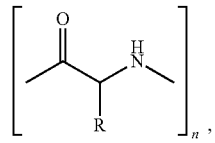

wherein the R group is an amino acid selected from the group consisting of alanine, arginine, aspartic acid, cysteine, glutamic acid, glycine, histidine, isoleucine, leucine, lysine, methionine, phenylalanine, proline, serine, threonine, tryptophan, tyrosine, and valine, and wherein n is an integer between about 500 and about 2500.

Element B2: Further comprising hydrophobically modifying the hydrolyzed canola protein backbone by a reaction of between about 5% and about 95% of the R groups with a hydrophobic group selected from the group consisting of ethyleneoxide, an ethyleneoxide derivative, propyleneoxide, a propylene oxide derivative, a long-chain hydrocarbon, and any combination thereof.

Element B3: Wherein the hydrolyzed canola protein backbone is chemically reacted with ethyl chloroformate.

Element B4: Wherein the water-swellable polymeric material is grafted onto the hydrolyzed canola protein backbone in the presence of a material selected from the group consisting of a crosslinker, an initiator, and any combination thereof, wherein the crosslinker is selected from the group consisting of N,N'-methylenebis(acrylamide), tetraethylene glycol, ethylene glycol diacrylate, a vinyl halide, an acrylic monomer, and any combination thereof, and wherein the initiator is selected from the group consisting of potassium persulfate, sodium persulfate, ammonium persulfate, sodium bisulfite, peroxodisulfate(VI) ion, azobisisobutyronitrile, benzoyl peroxide, and any combination thereof.

Element B5: Wherein the conformance fluid further comprises a hydrocolloid agent in the amount of about 1% to about 10% by weight of the treatment fluid.

Element B6: Wherein the conformance fluid further comprises an oxidizing breaker selected from the group consisting of sodium perborate, hydrogen peroxide, an alkali metal peroxide, sodium carbonate peroxydihydrate, sodium peroxydiphosphate, potassium peroxydiphosphate, potassium carbonate peroxydihydrate, any encapsulated in an encapsulating material, and any combination thereof.

Element B7: Wherein the aqueous fluid is selected from the group consisting of produced aqueous fluid by the subterranean formation, introduced aqueous fluid into the subterranean formation, and any combination thereof.

Element B8: Further comprising repeating steps (b) through (d) at at least a second permeable zone in the subterranean formation.

Element B9: Further comprising a wellhead with a tubular extending therefrom and into the subterranean formation, and a pump fluidly coupled to the tubular, wherein a fluid selected from the group consisting of the conformance fluid, the aqueous fluid, and any combination thereof are introduced into the subterranean formation through the tubular.

By way of non-limiting example, exemplary combinations applicable to B include: B with B1, B2, and B5; B with B8 and B9; B with B4, B6, and B7; B with B2, B3, and B6; B with B4 and B7; B with B2 and B8.

Embodiment C

A conformance fluid comprising: a base fluid; and a canola protein-based hydrogel comprising a copolymer of a water-swellable polymeric material grafted onto a hydrolyzed canola protein backbone, wherein the canola protein-based hydrogel is present in the conformance fluid in an amount in the range of from about 1% to about 10% by weight of the conformance fluid.

Embodiment C may have one or more of the following additional elements in any combination:

Element C1: wherein the hydrolyzed canola protein backbone comprises the formula:

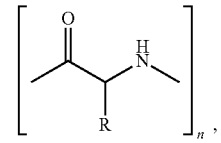

wherein the R group is an amino acid selected from the group consisting of alanine, arginine, aspartic acid, cysteine, glutamic acid, glycine, histidine, isoleucine, leucine, lysine, methionine, phenylalanine, proline, serine, threonine, tryptophan, tyrosine, and valine, and wherein n is an integer between about 500 and about 2500.

Element C2: Further comprising hydrophobically modifying the hydrolyzed canola protein backbone by a reaction of between about 5% and about 95% of the R groups with a hydrophobic group selected from the group consisting of ethyleneoxide, an ethyleneoxide derivative, propyleneoxide, a propylene oxide derivative, a long-chain hydrocarbon, and any combination thereof.

Element C3: Wherein the hydrolyzed canola protein backbone is chemically reacted with ethyl chloroformate.

Element C4: Wherein the water-swellable polymeric material is grafted onto the hydrolyzed canola protein backbone in the presence of a material selected from the group consisting of a crosslinker, an imitator, and any combination thereof, wherein the crosslinker is selected from the group consisting of N,N'-methylenebis(acrylamide), tetraethylene glycol, ethylene glycol diacrylate, a vinyl halide, an acrylic monomer, and any combination thereof, and wherein the initiator is selected from the group consisting of potassium persulfate, sodium persulfate, ammonium persulfate, sodium bisulfite, peroxodisulfate(VI) ion, azobisisobutyronitrile, benzoyl peroxide, and any combination thereof.

Element C5: Wherein the conformance fluid further comprises a hydrocolloid agent in the amount of about 1% to about 10% by weight of the treatment fluid.

Element C6: Wherein the conformance fluid further comprises an oxidizing breaker selected from the group consisting of sodium perborate, hydrogen peroxide, an alkali metal peroxide, sodium carbonate peroxydihydrate, sodium peroxydiphosphate, potassium peroxydiphosphate, potassium carbonate peroxydihydrate, any encapsulated in an encapsulating material, and any combination thereof.

Element C7: Further comprising a wellhead with a tubular extending therefrom and into a subterranean formation, and a pump fluidly coupled to the tubular, wherein the conformance fluid is introduced into the subterranean formation through the tubular.

By way of non-limiting example, exemplary combinations applicable to C include: C with C1 and C6; C with C5 and C7; C with C3, C4, and C6; C with C2 and C5; C with C4 and C5; C with C1, C3, and C6.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
(a) preparing a conformance fluid comprising an aqueous base fluid and a canola protein-based hydrogel (CPBH),
wherein the CPBH comprises a copolymer of a water-swellable polymeric material grafted onto a hydrolyzed canola protein backbone and is at least partially hydrophobic, and
wherein the aqueous base fluid causes the CPBH to swell;
(b) contacting the conformance fluid with at least a portion of a first permeable zone in a subterranean formation, thereby depositing the CPBH onto or into the first permeable zone; and
(c) sealing at least a portion of the first permeable zone with the CPBH.

2. The method of claim 1, wherein the hydrolyzed canola protein backbone comprises the formula:

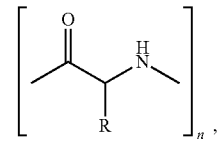

wherein the R group is an amino acid selected from the group consisting of alanine, arginine, aspartic acid, cysteine, glutamic acid, glycine, histidine, isoleucine, leucine, lysine, methionine, phenylalanine, proline, serine, threonine, tryptophan, tyrosine, and valine, and wherein n is an integer between about 500 and about 2500.

3. The method of claim 2, further comprising hydrophobically modifying the hydrolyzed canola protein backbone by a reaction of between about 5% and about 95% of the R groups with a hydrophobic group selected from the group consisting of ethyleneoxide, an ethyleneoxide derivative, propyleneoxide, a propylene oxide derivative, a long-chain hydrocarbon, and any combination thereof.

4. The method of claim 1, wherein the hydrolyzed canola protein backbone is chemically reacted with ethyl chloroformate.

5. The method of claim 1, wherein the water-swellable polymeric material is grafted onto the hydrolyzed canola protein backbone in the presence of a material selected from the group consisting of a crosslinker, an initiator, and any combination thereof, wherein the crosslinker is selected from the group consisting of N,N'-methylenebis(acrylamide), tetraethylene glycol, ethylene glycol diacrylate, a vinyl halide, an acrylic monomer, and any combination thereof, and wherein the initiator is selected from the group consisting of potassium persulfate, sodium persulfate, ammonium persulfate, sodium bisulfite, peroxodisulfate(VI) ion, azobisisobutyronitrile, benzoyl peroxide, and any combination thereof.

6. The method of claim 1, wherein the conformance fluid further comprises a hydrocolloid agent in the amount of about 1% to about 10% by weight of the treatment fluid.

7. The method of claim 1, wherein the conformance fluid further comprises an oxidizing breaker selected from the group consisting of sodium perborate, hydrogen peroxide, an alkali metal peroxide, sodium carbonate peroxydihydrate, sodium peroxydiphosphate, potassium peroxydiphosphate, potassium carbonate peroxydihydrate, any encapsulated in an encapsulating material, and any combination thereof.

8. The method of claim 1, further comprising repeating steps (b) through (c) at at least a second permeable zone in the subterranean formation.

9. The method of claim 1, further comprising a wellhead with a tubular extending therefrom and into the subterranean formation, and a pump fluidly coupled to the tubular,
wherein step (b) includes introducing the conformance fluid through the tubular.

10. A method comprising:
(a) preparing a conformance fluid comprising an aqueous base fluid and a canola protein-based hydrogel (CPBH),
wherein the CPBH comprises a copolymer of a water-swellable polymeric material grafted onto a hydrolyzed canola protein backbone and is at least partially hydrophobic,
(b) contacting the conformance fluid with at least a portion of a first permeable zone in a subterranean formation, thereby depositing the CPBH onto or into the first permeable zone;
(c) passing an aqueous fluid over the first permeable zone, wherein the aqueous base fluid causes the CPBH to swell; and
(d) sealing at least a portion of the first permeable zone with the CPBH.

11. The method of claim 10, wherein the hydrolyzed canola protein backbone comprises the formula:

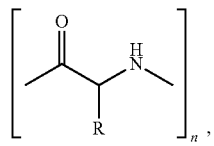

wherein the R group is an amino acid selected from the group consisting of alanine, arginine, aspartic acid, cysteine, glutamic acid, glycine, histidine, isoleucine, leucine, lysine, methionine, phenylalanine, proline, serine, threonine, tryptophan, tyrosine, and valine, and
wherein n is an integer between about 500 and about 2500.

12. The method of claim 11, further comprising hydrophobically modifying the hydrolyzed canola protein backbone by a reaction of between about 5% and about 95% of the R groups with a hydrophobic group selected from the group consisting of ethyleneoxide, an ethyleneoxide derivative, propyleneoxide, a propylene oxide derivative, a long-chain hydrocarbon, and any combination thereof.

13. The method of claim 10, wherein the hydrolyzed canola protein backbone is chemically reacted with ethyl chloroformate prior to forming the CPBH.

14. The method of claim 10, wherein the water-swellable polymeric material is grafted onto the hydrolyzed canola protein backbone in the presence of material selected from the group consisting of a crosslinker, an initiator, and any combination thereof, wherein the crosslinker is selected from the group consisting of N,N'-methylenebis(acrylamide), tetraethylene glycol, ethylene glycol diacrylate, a vinyl halide, an acrylic monomer, and any combination thereof, and wherein the initiator is selected from the group consisting of potassium persulfate, sodium persulfate, ammonium persulfate, sodium bisulfite, peroxodisulfate(VI) ion, azobisisobutyronitrile, benzoyl peroxide, and any combination thereof.

15. The method of claim 10, wherein the conformance fluid further comprises a hydrocolloid agent in the amount of about 1% to about 10% by weight of the treatment fluid.

16. The method of claim 10, wherein the conformance fluid further comprises an oxidizing breaker selected from the group consisting of sodium perborate, hydrogen peroxide, an alkali metal peroxide, sodium carbonate peroxydihydrate, sodium peroxydiphosphate, potassium peroxydiphosphate, potassium carbonate peroxydihydrate, any encapsulated in an encapsulating material, and any combination thereof.

17. The method of claim 10, wherein the aqueous fluid is selected from the group consisting of produced aqueous fluid by the subterranean formation, introduced aqueous fluid into the subterranean formation, and any combination thereof.

18. The method of claim 10, further comprising a wellhead with a tubular extending therefrom and into the subterranean formation, and a pump fluidly coupled to the tubular,
wherein a fluid selected from the group consisting of the conformance fluid, the aqueous fluid, and any combination thereof are introduced into the subterranean formation through the tubular.

19. A conformance fluid comprising:
a base fluid; and
a canola protein-based hydrogel comprising a copolymer of a water-swellable polymeric material grafted onto a hydrolyzed canola protein backbone,
wherein the canola protein-based hydrogel is present in the conformance fluid in an amount in the range of from about 1% to about 10% by weight of the conformance fluid.

20. The conformance fluid of claim 19, wherein the hydrolyzed canola protein backbone comprises the formula:

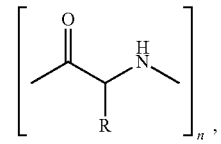

wherein the R group is an amino acid selected from the group consisting of alanine, arginine, aspartic acid, cysteine, glutamic acid, glycine, histidine, isoleucine, leucine, lysine, methionine, phenylalanine, proline, serine, threonine, tryptophan, tyrosine, and valine, and
wherein n is an integer between about 500 and about 2500.

* * * * *